United States Patent
Dadhaniya et al.

(10) Patent No.: US 12,248,926 B2
(45) Date of Patent: Mar. 11, 2025

(54) AUTOMATED TELLER MACHINE AND MOBILE COMPUTING DEVICE WITH SYNCHRONIZED DISPLAYS

(71) Applicant: Capital One Services, LLC, McLean, VA (US)

(72) Inventors: Janak Dadhaniya, San Francisco, CA (US); Matthew Wilson, San Francisco, CA (US); Lisa Whitsitt, Millbrae, CA (US); Cheng Xu, San Francisco, CA (US); Robert Smith, Crozier, VA (US); Steve Faletti, Brooklyn, NY (US); David Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 186 days.

(21) Appl. No.: 17/486,289

(22) Filed: Sep. 27, 2021

(65) Prior Publication Data
US 2022/0012713 A1    Jan. 13, 2022

Related U.S. Application Data

(63) Continuation of application No. 16/693,912, filed on Nov. 25, 2019, now abandoned.

(51) Int. Cl.
*G06Q 20/32* (2012.01)
*G06F 3/14* (2006.01)
*G07F 19/00* (2006.01)

(52) U.S. Cl.
CPC ....... *G06Q 20/3278* (2013.01); *G06F 3/1454* (2013.01); *G06Q 20/3221* (2013.01); *G06Q 20/3224* (2013.01); *G06Q 20/3276* (2013.01); *G07F 19/00* (2013.01)

(58) Field of Classification Search
CPC .......... G06Q 20/3278; G06Q 20/3221; G06Q 20/3224; G06Q 20/3276; G06F 3/1454; G07F 19/00
USPC .......................................................... 705/44
See application file for complete search history.

(56) References Cited

U.S. PATENT DOCUMENTS

| | | | | |
|---|---|---|---|---|
| 7,606,560 | B2* | 10/2009 | Labrou | G06Q 20/4014 |
| | | | | 713/172 |
| 10,482,462 | B1* | 11/2019 | Eidam | G06F 3/0482 |
| 2016/0253651 | A1* | 9/2016 | Park | G06Q 20/34 |
| | | | | 705/39 |
| 2017/0185996 | A1* | 6/2017 | Parekh | G06Q 20/3672 |
| 2019/0108731 | A1* | 4/2019 | Hazard | G07F 19/206 |

\* cited by examiner

*Primary Examiner* — Lindsay M Maguire
(74) *Attorney, Agent, or Firm* — KDW Firm PLLC

(57) ABSTRACT

An automated teller machine (ATM) has a display and a wireless communication interface. The ATM may detect a proximity of a mobile computing device and exhibit on its display an indication of the proximity of mobile computing device to the ATM. The ATM may also be configured to detect when the mobile computing device and the ATM have established a wireless communication connection and display a visual cue on the display that the wireless connection has been established. The ATM is configured to synchronize the display of the ATM with a display of the mobile computing device. The displays may be synched temporally and positionally and may display the same or related content, such as an image or animation at the same time.

20 Claims, 15 Drawing Sheets

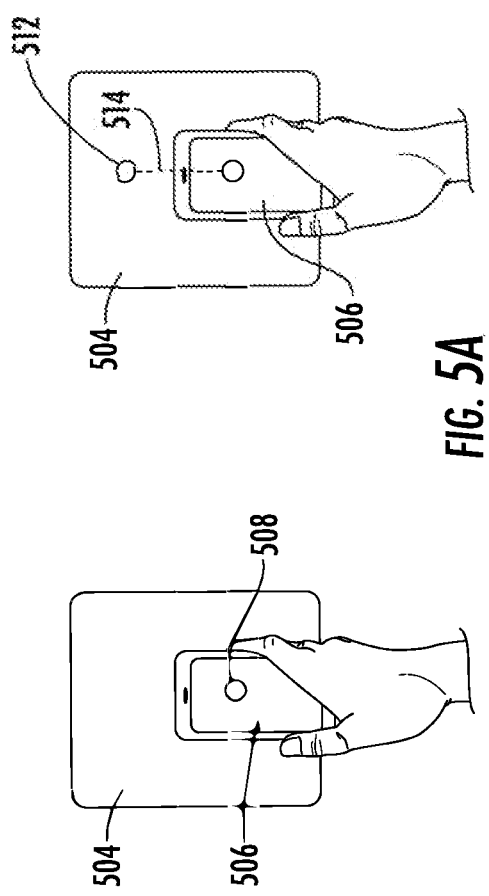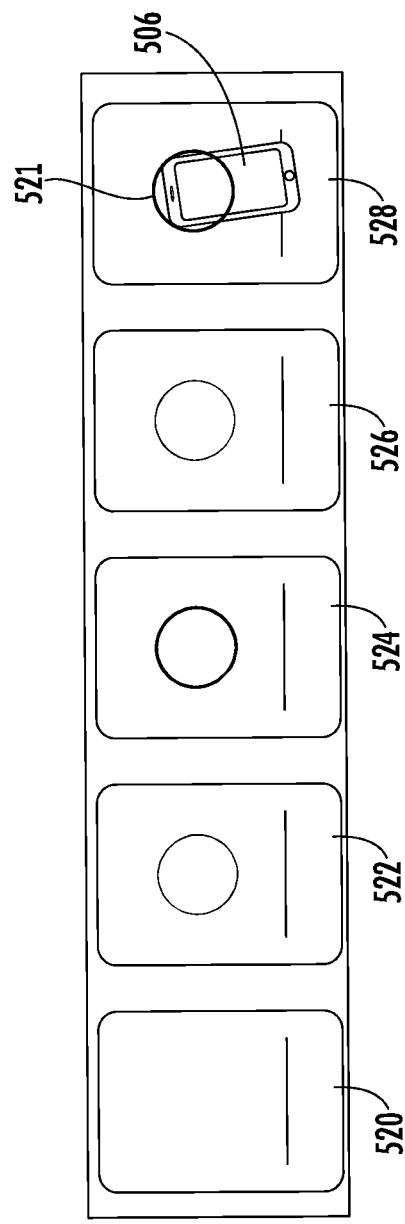
FIG. 5A
FIG. 5B

AUTOMATED TELLER MACHINE AND MOBILE COMPUTING DEVICE WITH SYNCHRONIZED DISPLAYS

RELATED APPLICATIONS

This application is a continuation of U.S. patent application Ser. No. 16/693,912, titled "SYNCHRONIZING A DISPLAY OF AN AUTOMATED TELLER MACHINE WITH A DISPLAY OF A MOBILE DEVICE" filed on Nov. 25, 2019. The contents of the aforementioned application are incorporated herein by reference in their entirety.

BACKGROUND

Conventionally, a party uses an automated teller machine (ATM) by approaching the machine and putting a card, such as a debit card, into the ATM. The user then is prompted via a display on the ATM to enter a personal identification number (PIN) via a keypad or touchscreen on the ATM. If the user enters a proper PIN, the display presents the user with choices for financial transactions. The user may select a transaction via the screen if the screen is a touchscreen or may use the keypad. Hardware is provided on the ATM for dispensing cash and receiving deposits. Once the financial transaction is complete, the user may have the option of receiving a printed receipt created by a printer in the ATM.

SUMMARY

In accordance with an exemplary embodiment, a computer-implemented method is practiced such that a wireless communication session is initiated with an ATM from a mobile computing device. The communication session is conducted initially using a near field communication (NFC) wireless protocol that requires proximity between the mobile computing device and the ATM. A wireless communication that the communication session with the ATM has been initiated is received via the NFC wireless protocol. A graphical cue that the session has been initiated is displayed on a display of the mobile computing device. An additional communication is received via the NFC wireless protocol indicating that ATM and the mobile computing device are now connected. The display of the mobile computing device is updated to provide a second graphical cue indicating that the ATM is connected with the mobile device, wherein the visual cue is synched with a corresponding display on the ATM. A financial transaction is initiated with the ATM from the mobile device. The display of the mobile computing device is updated to show progress of the transaction. When the transaction is complete, the display of the mobile computing device is updated to indicate that the transaction is complete.

Instructions for practicing this method may be stored on a non-transitory computer-readable storage device.

When the session is complete, the display of the mobile computing device may be updated to indicate that the session is complete. The updating of the display on the mobile computing device may be coordinated with timing of updating the display on the ATM. The mobile computing device may include an application program for communicating with the ATM via a cellular network. The application program may be executed, and the financial transaction may be initiated by the application program that provides a user interface for a user to initiate the financial transaction. The initiating of the wireless communication session may comprise scanning an optical code associated with the ATM. The mobile computing device may send a communication to a server via a cellular network to initiate the financial transaction in the initiating of the financial transaction with the ATM, where the server has a secured connection with the ATM.

In accordance with an exemplary embodiment, a computer-implemented method is practiced. Per this method a proximity of a mobile computing device to an automated teller machine (ATM) is detected. A wireless communication with the mobile computing device via a wireless protocol takes place, wherein the wireless protocol requires proximity between the mobile computing device and the ATM. A visual cue indicating that the ATM and the mobile computing device are communicating via the wireless protocol is displayed on a display of the ATM. The mobile device communicates with the mobile computing device over a cellular network to establish a connection between the ATM and the mobile computing device. The display of the ATM is updated to indicate that the ATM and the mobile computing device are connected. A communication that the mobile computing device wishes to initiate financial transaction via the ATM is received. The financial transaction is initiated. The display of the ATM is synched with the display of the mobile computing device for the financial transaction. When the transaction is complete, the display of the ATM is updated to indicate that the transaction is complete.

Instructions for practicing this method may be stored on a non-transitory computer-readable storage device.

An indication that the mobile computing device is no longer interacting with the ATM may be received, and the display of the ATM may be updated to reflect that the mobile computing device is no longer interacting with the ATM. The detecting of the proximity of the mobile computing device may comprise detecting that the mobile computing device is within range of an NFC transceiver of the ATM. The detecting of the proximity of the mobile device may comprise detecting that the mobile computing device is sufficiently close to a designated portion of the ATM. An indication that the mobile computing device has indicated a desire to communicate with the ATM may be received before detecting the proximity of the mobile computing device. The mobile computing device may indicate a desire to communicate with the ATM by scanning an optical code at the ATM. The optical code may be positioned on the ATM. The financial transaction may be one of at least checking an account balance, making a deposit to an account, making a withdrawal from an account, initiating a transfer of funds from an account or purchasing an item. The synching of the display of the ATM may comprise displaying content on the display of the ATM that is related to content to be simultaneously displayed on the display of the mobile computing device.

In accordance with an exemplary embodiment, a non-transitory computer-readable storage medium stores computer-executable instructions for causing a mobile computing device to perform the following. A wireless communication session is initiated with an automated teller machine (ATM) from the mobile computing device, in which the communication session is conducted initially using a wireless protocol that requires proximity between the mobile computing device and the ATM. Feedback that the communication session with the ATM has been initiated is received. An indication that the session has been initiated is displayed on a display of the mobile computing device. Additional feedback indicating that ATM and the mobile computing device are now connected is received. The display of the mobile computing device is updated to provide a visual cue that indicates that the ATM is connected with the mobile device, wherein the visual cue is synched with a corresponding display on the ATM. A financial transaction with the ATM is initiated from the mobile device. The display of the mobile computing device is updated to show progress of the transaction. An animation is displayed on the display of the mobile computing device, wherein the animation relates to the financial transaction and is temporally synched with a corresponding animation on a display of the ATM.

The non-transitory computer-readable storage medium may additionally store instructions that cause the mobile computing device to complete the financial transaction and update the display of the mobile computing device to indicate that the financial transaction is complete. The positioning of the visual cue on the display of the mobile computing device may depend on a relative position of the mobile computing device to the ATM. The financial transaction may be initiated via communication over a cellular network.

BRIEF DESCRIPTION OF THE DRAWINGS

FIG. 5A shows an example of a user phone display being synched with an ATM display by tapping the phone on a designated area of the front face of the ATM.

FIG. 5B shows an example of a changing ATM display as a mobile computing device is moved toward the ATM display and synched.

DETAILED DESCRIPTION

Exemplary embodiments may enable synchronization of a display of a mobile computing device with a display of an ATM. The displays first may be synched when a user positions the mobile computing device in proximity to the ATM. Near field communication (NFC) initially may be used when the mobile phone is in proximity with the ATM. A party may be prompted to tap the mobile computing device with a designated area on the face of the ATM or scan a scannable code with the mobile computing device at the ATM to prompt the connection in some exemplary embodiments. The NFC communication may be used to establish a communication connection between the mobile computing device and the ATM and may prompt an initial sequence on the displays indicating that the displays are synched.

The displays may reflect when a mobile computing device is in proximity to an ATM. For instance, a particular graphic may be displayed when the mobile computing device is in proximity to an ATM. The graphic may change as the mobile computing device gets closer to the ATM. The change may be, for example, in the form of changing intensity, color, shape or the like. In addition, the displays may provide a visual cue indicating that a communication connection between the mobile computing device and ATM has been realized. Once the communication connection has been realized, the displays may be synchronized to reflect the connection.

After the NFC connection has been realized, a cellular connection between a user's mobile computing device with a server having a secure connection with the ATM may be established. This may be prompted by opening an application responsive to the NFC communication and the application establishing the cellular connection. One or more financial transactions may be initiated with the ATM from the mobile computing device via the cellular connection. The display of the mobile computing device and the ATM may remain synched during the one or more financial transactions.

Figure 1:
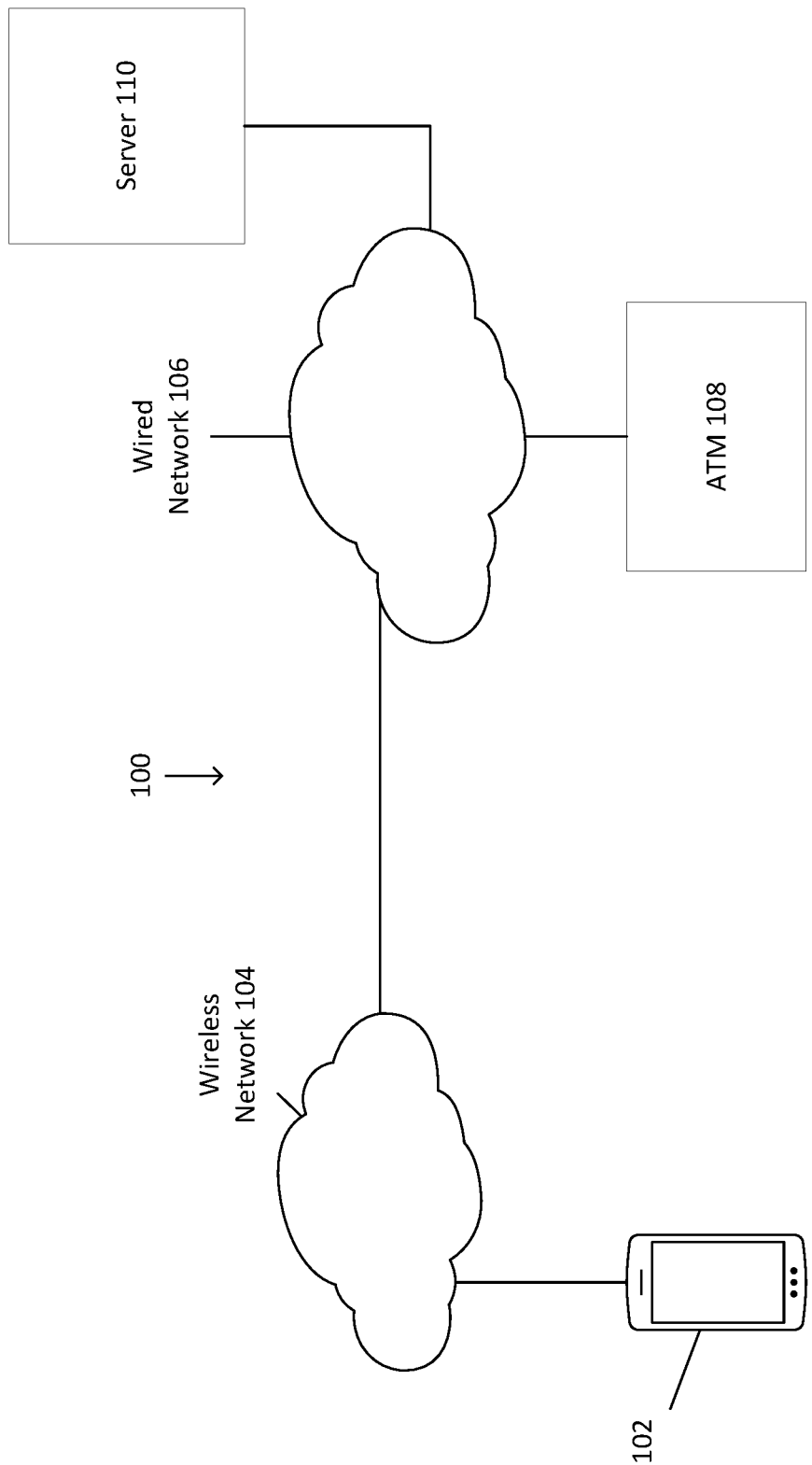
FIG. 1 depicts components of an environment that is suitable for practicing an exemplary embodiment.

FIG. 1 depicts components of an environment 100 in which exemplary embodiments may be practiced. This depiction is merely illustrative and is not intended to be limiting. A mobile computing device 102 is connected to a wireless network 104. The mobile computing device 102 may take many forms. The wireless network 104 may be, for instance, a cellular network or an 802.11 network. The wireless network 104 may interface with a wired network 106, such as the Internet and/or other networks. In an illustrative case, the wired network 106, includes the Internet and other wired networks, such as private networks of a financial institution that have an interface with the Internet. An ATM 108 and a server 110 may be interfaced with the wired network 106. The ATM 108 may be for the financial institution or may be for another financial institution but allow access to customers of the financial institution. The server 110 may be resident on a private network for a financial institution or may be provided as part of secure cloud services provided for the financial institution. The server 110 has a secure connection with the ATM 108.

Figure 2A:
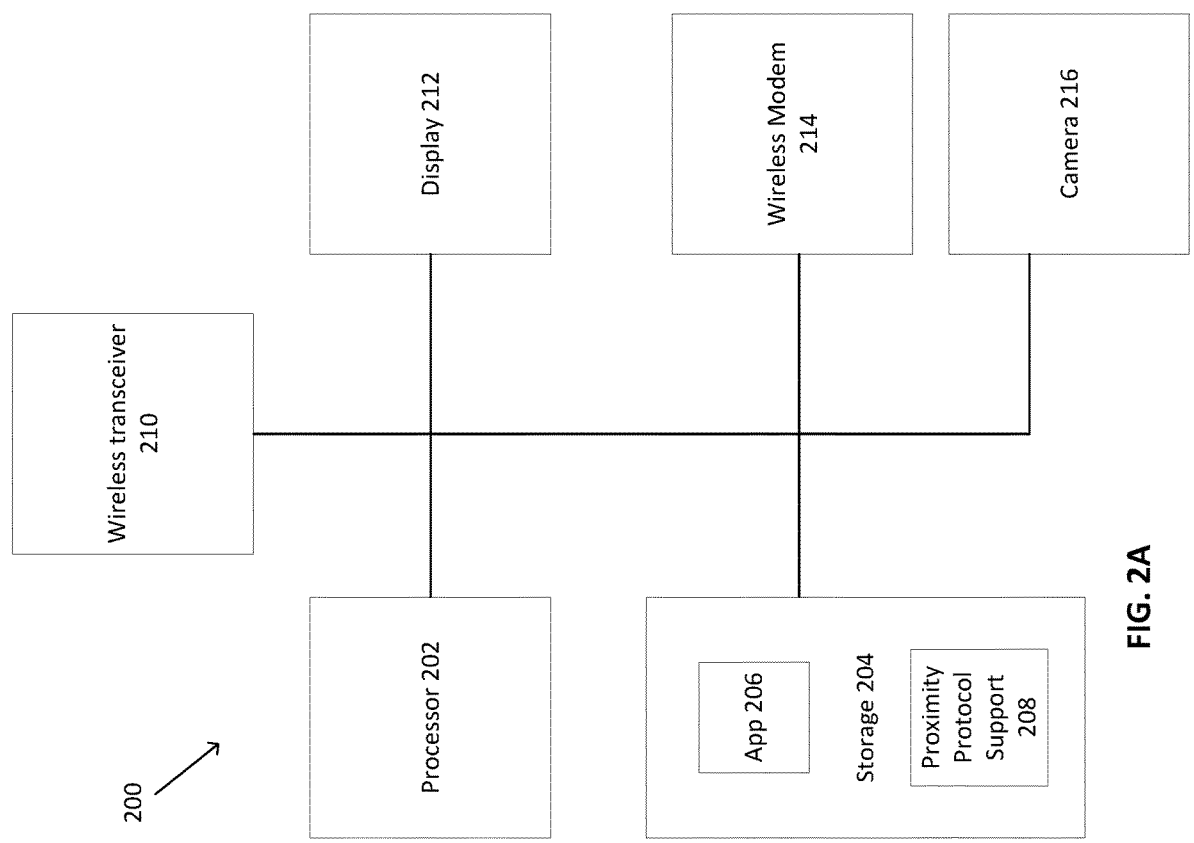
FIG. 2A depicts a block diagram of components of an illustrative mobile computing device.

FIG. 2A depicts illustrative components for a mobile computing device 200 for use with exemplary embodiments. The mobile computing device 200 may include a processor 202. The processor 202 may be a microprocessor, such as a central processing unit (CPU), a graphics processing unit (GPU), etc. The processor 202 may be realized as a field programmable gate array (FPGA), an application specific integrated circuit (ASIC), a controller, electric circuitry or the like that provides the functionality described herein for the processor of the mobile computing device 200. The mobile computing device 200 may include a storage 204. The 204 storage may include volatile memory and/or nonvolatile memory. The storage 204 may include optical and/or magnetic storage devices and may include non-transitory computer-readable storage media storing instructions for execution by the processor 202. The storage 204 may include magnetic disk drives, optical disk drives, solid state storage, read only memory, random access memory, flash memory and the like. In the depiction of FIG. 2, the storage 204 stores an application program 206 and proximity protocol support 208 for NFC communication. It will be appreciated that the storage 204 may store other programs and data.

The mobile computing device 202 may include a wireless transceiver 210, such as required to participate in NFC communications. The transceiver may be part of an NFC reader. The mobile computing device 202 may additionally include a display device 212, such as a light emitting diode (LED) display, a liquid crystal display (LCD) or a retinal display. The mobile computing device may include a wireless modem 214 for enabling communication over a wireless network, such as a cellular phone network. The mobile computing device 200 may include a camera 216 for capturing images and/or video. The camera 216 may also be used in scanning optical codes.

Figure 2B:
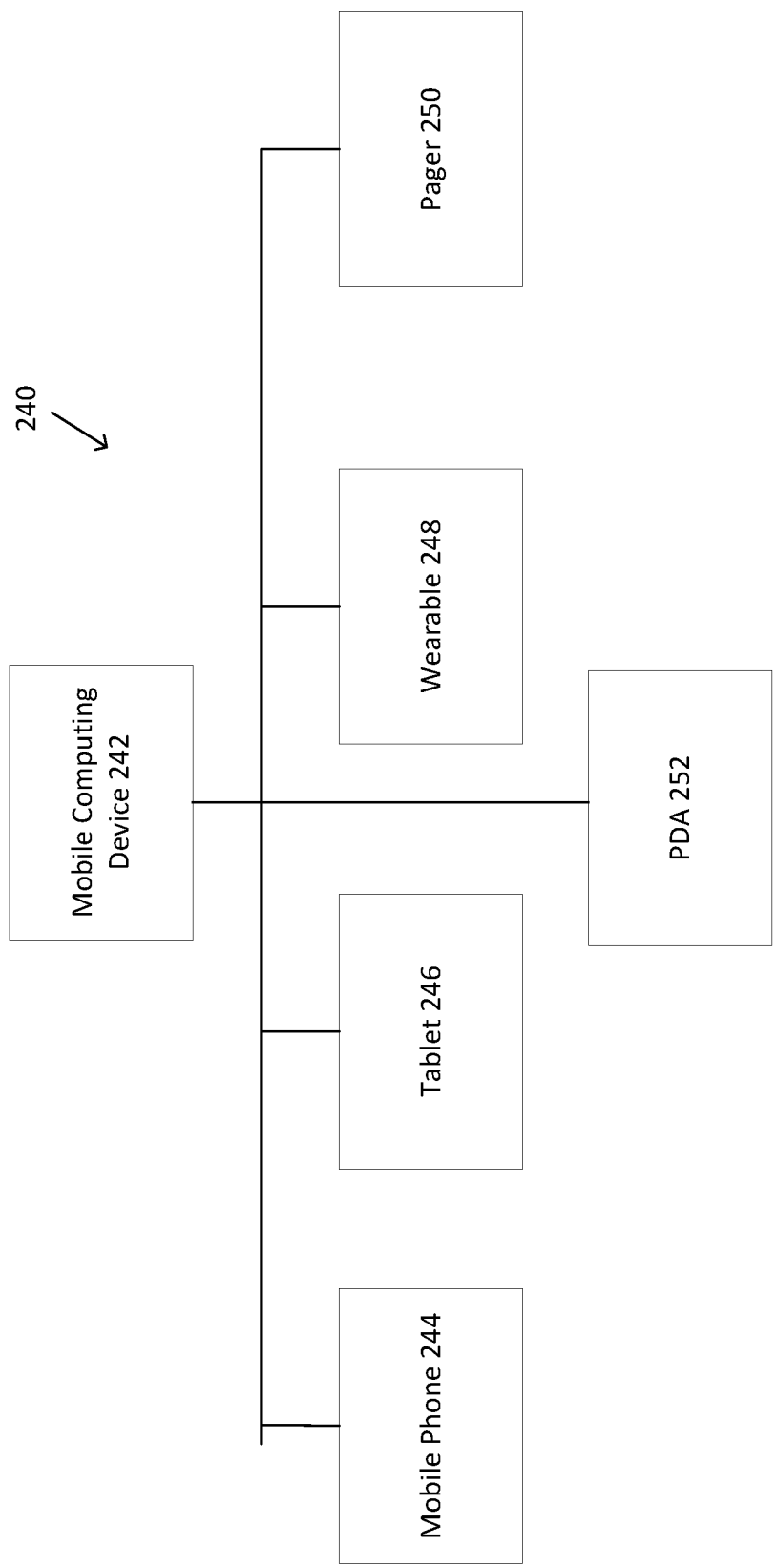
FIG. 2B depicts examples of different types of mobile computing devices that may be used in exemplary embodiments.

FIG. 2B depicts a block diagram 240 that depicts some of the different forms that mobile computing device 242 may take. For example, the mobile computing device 242 may be a mobile phone 244 or a tablet computing device 246. In addition, the mobile computing device 242 may be a wearable 248, such as a smart watch, that has cellular and NFC capabilities. The mobile computing device 242 may be an intelligent pager 248 or a personal digital assistant 252 with NFC and cellular capabilities.

Figure 3:
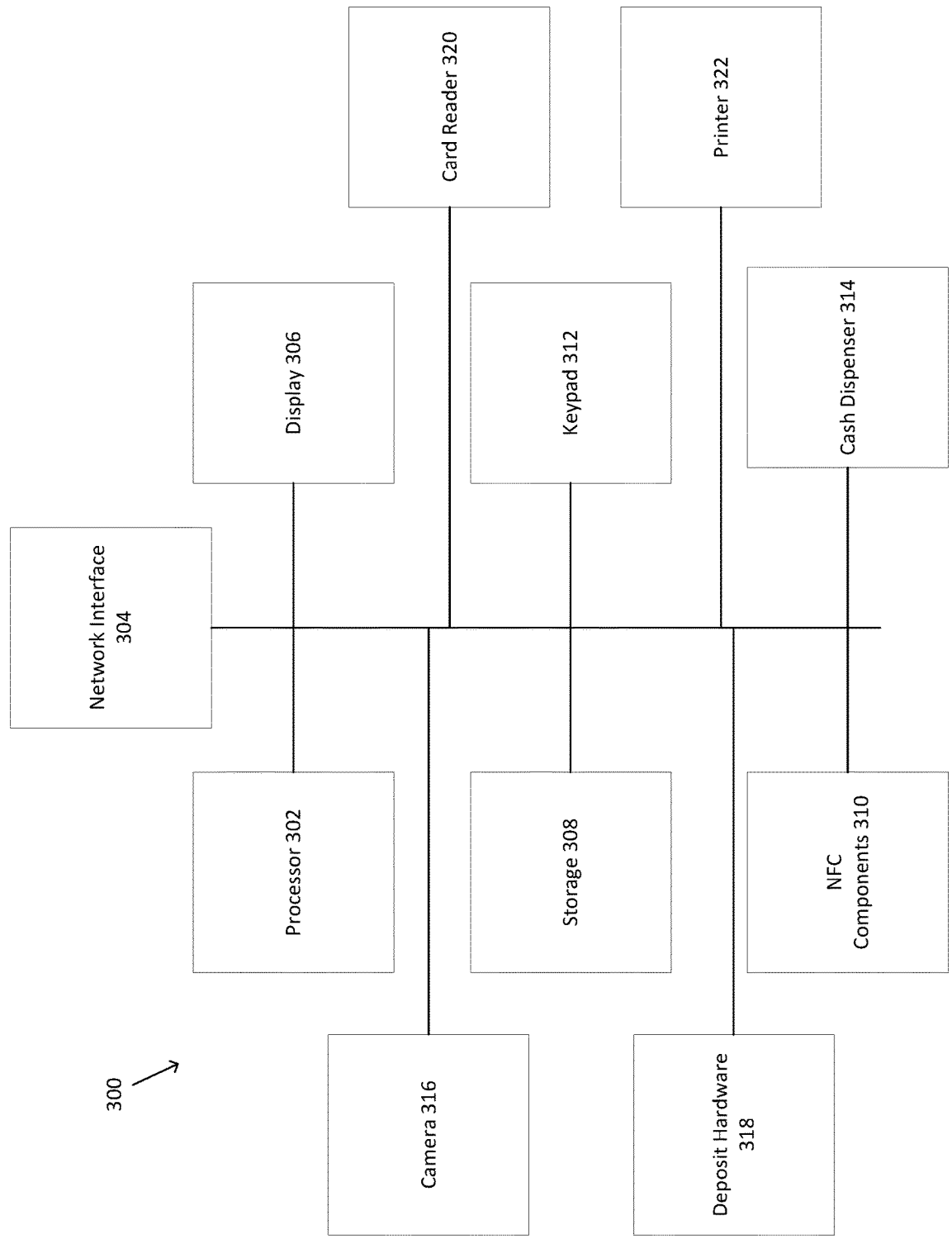
FIG. 3 depicts a block diagram of components of an illustrative ATM.

FIG. 3 depicts a block diagram of an illustrative ATM 300. The ATM 300 may include a processor 302 for executing software and providing functionality as described herein. The processor 302 may take many forms, such as those described above relative to the mobile computing device 200. The ATM 300 may include a network interface 304, such as a network adapter, for interfacing with a network, such as a secure local area network (LAN). The ATM 300 additionally may include a display 306 for displaying images, video and graphic content. The display 304 may take various forms, such as those described above for the mobile computing device 200. A storage 308 may be provided in the ATM 300 and may be used to store executable programming language code and data. The storage may take many forms, like those described above for the mobile computing device 200.

In order to support NFC communications, the ATM 300 may include NFC components 310. These NFC components 310 may include an NFC tag or reader as well as software that supports an NFC protocol.

The ATM 300 may include a keypad 312 that enables a user to provide input to the ATM. The keypad 312 may include buttons for entering alpha-numeric values. For example, a user may enter a PIN or a dollar amount value using the keypad 312. The ATM may have a cash dispenser 314 for dispensing currency such as bills. The ATM 300 may include a camera 316 for capturing images of parties in proximity to the ATM. The camera 316 may take the form of a digital camera that captures snapshot and/or videos. The camera 316 may be used for security purposes. The ATM 300 may also include deposit hardware 318 for accepting deposits in the form of checks or cash. The ATM 300 may include further components, such as a card reader 320 for reading ATM cards and a printer 322 for printing receipts, statements and the like.

The depiction of the ATM components in FIG. 3 is merely illustrative and is not intended to be limiting.

Figure 4A:
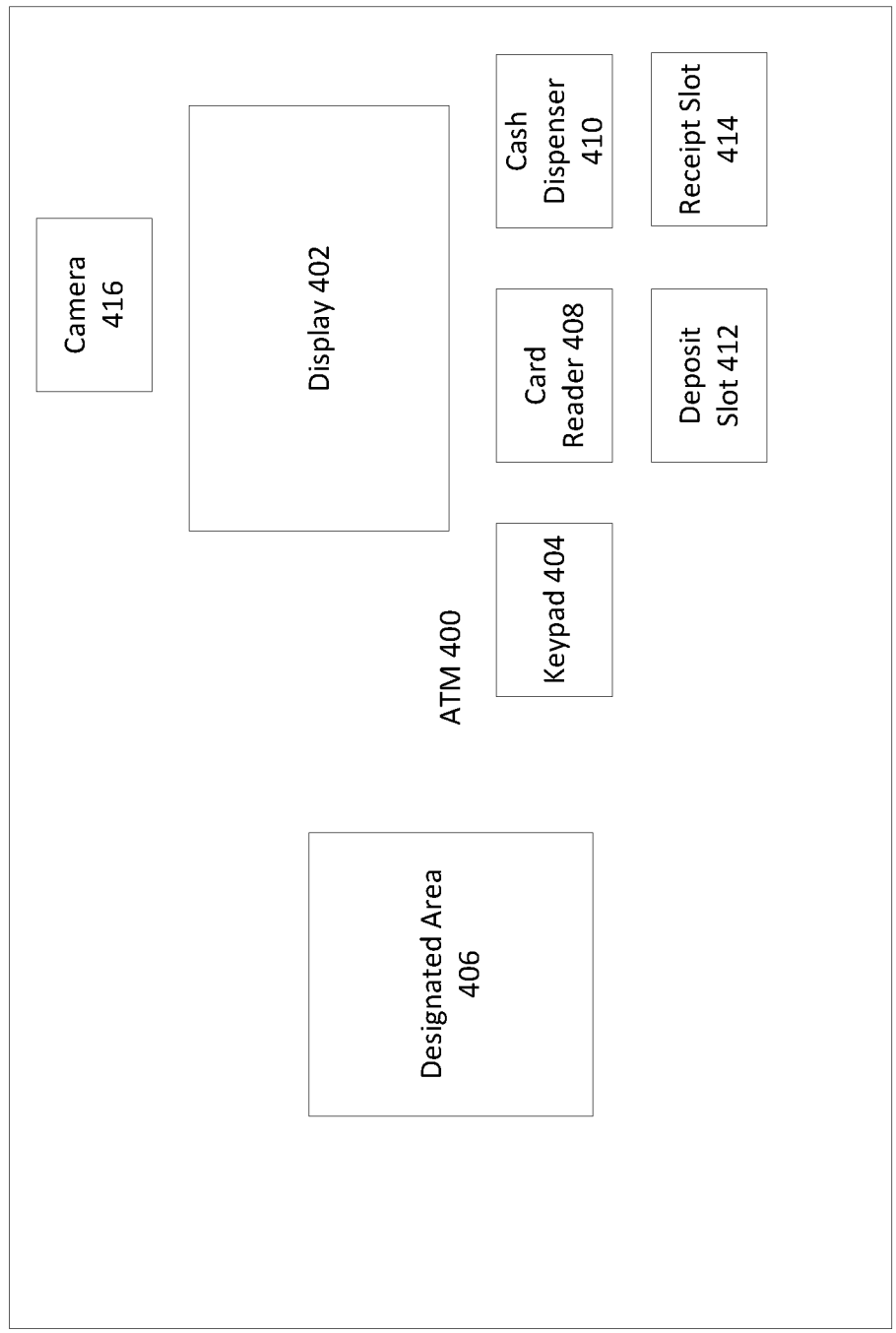
FIG. 4A depicts an illustrative front face of an ATM with a designated area for positioning a mobile computing device for NFC communication.

FIG. 4A depicts one possible configuration of a front face of an ATM 400 for use in an exemplary embodiment. The front face is the face that faces the customer. Not only of the components of the front face are depicted in FIG. 4A. The front face of the ATM includes a display 402 for displaying graphical and video content, such as has been described above relative to display 306 of FIG. 3. The front face of the ATM also includes the keypad 404 for the user to enter alpha number input and press any function keys. A card reader 408 and a cash dispenser 410 may be provided. Further, a deposit slot 412 and a receipt slot 414 may be provided along with a camera 416. The front face further includes a designated area 406. The designated area 406 may contain NFC hardware and is designed to be an area where a user may put a mobile computing device in proximity or contact to initiate an NFC communication session as will be described below.

Figure 4B:
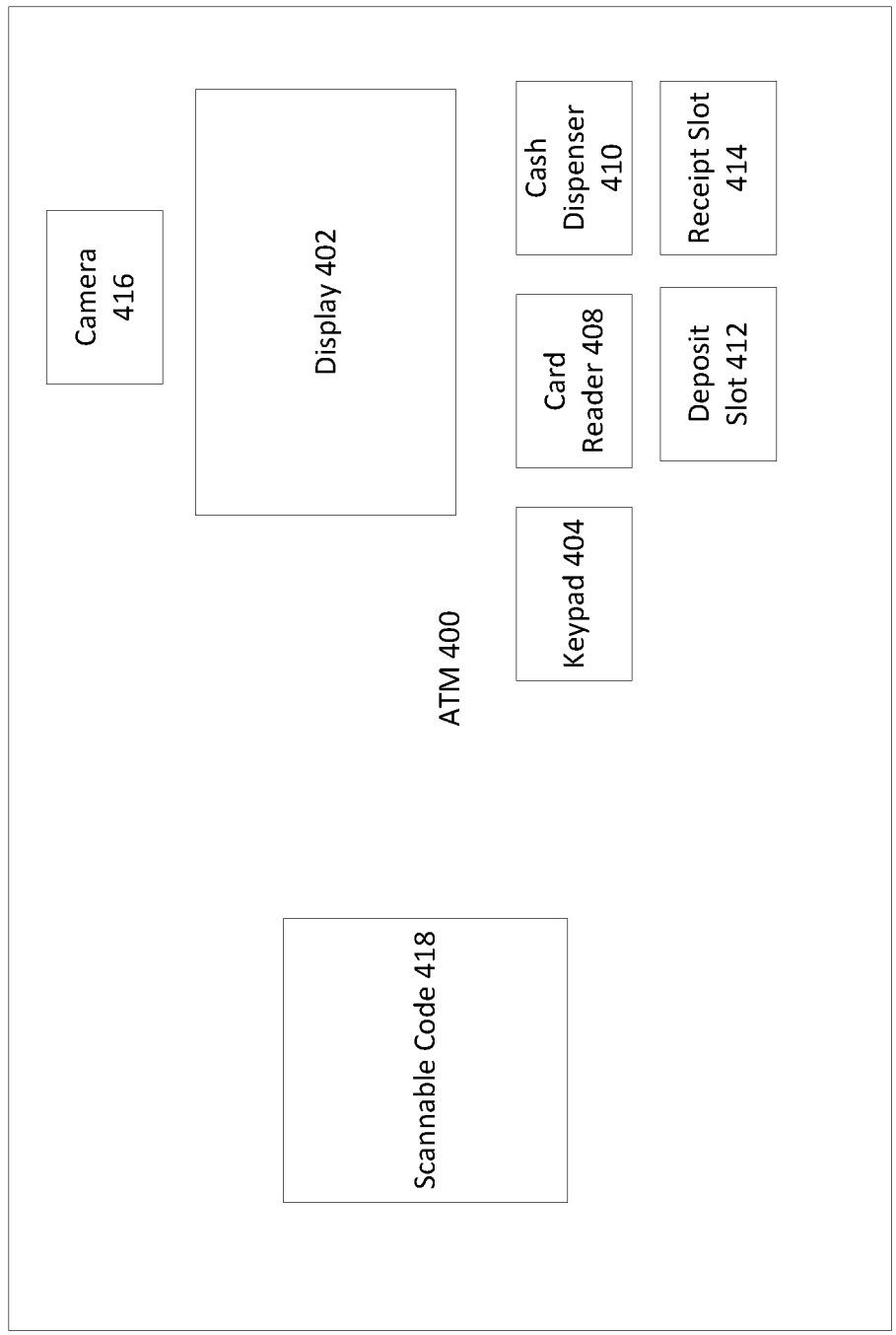
FIG. 4B depicts an illustrative front face of an ATM with a scannable code on the front face.

FIG. 4B depicts an alternative configuration for the front face of the ATM for some exemplary embodiments. In this configuration, the designated area 406 is not provided. Instead, scannable code 418, such as a QR code, a barcode or other scannable code is provided. The scannable code 418 may be optical or magnetic. In this configuration, the user scans the scannable code with the mobile computing device to trigger a communication session as will be described below. For instance, the camera 216 (FIG. 2A) of the mobile computing device may be used to capture an image of the scannable code and software may be used to process the image, identify the code and respond accordingly.

It should be appreciated that the front face configurations of FIGS. 4A and 4B need not be mutually exclusive; rather they may be combined to provide both a designated area 406 and a scannable code 418.

The exemplary embodiments may provide visual feedback regarding proximity of a mobile computing device to an ATM and visual feedback regarding creation of a communication connection between a mobile computing device and an ATM. FIG. 5A depicts one example of such visual feedback. In FIG. 5A a user has positioned a mobile phone 506 in close proximity to a designated area 504 on an ATM. The user may even tap the mobile phone 506 with the designated area. A graphic 508 is displayed on the display of the mobile phone 506 but not on an ATM display. The graphic 508 in this instance is a dot. The graphic 508 is indicative of the mobile phone being in proximity to the ATM. Once a communication session between the ATM and the mobile computing device has been established, the graphic 506 may be shown on the mobile computing device display. A corresponding version of the graphic 512 may also be displayed on a display of the ATM 504. A graphic connector 514 may be shown on both displays to connect graphic 506 with corresponding graphic 512.

FIG. 5B shows another example of how visual cues may be provided. Initially an ATM display is blank. Then a graphic 521 is displayed on the display 520 of the ATM, which may appear and pulse as the mobile computing device gets closer (see successive views 522, 524, 526 and 528). As shown in the rightmost depiction, when a communication session has been established the graphic 521 may be shown on both the display of the mobile computing device and the display of the ATM. The portion of the graphic 521 and the relative position of the portion may be based on the location of one display relative to the other. The visual result is that the displays are synchronized, and the visual result is as if a single shared graphic 521 is displayed.

Figure 6:
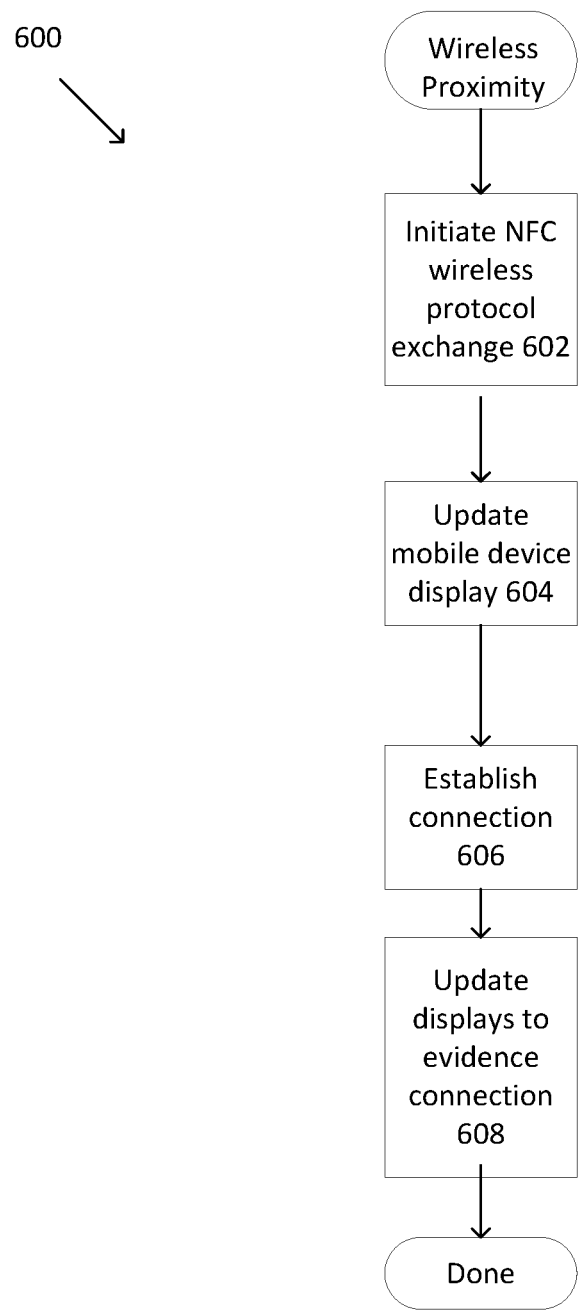
FIG. 6 depicts a flowchart of steps that may be taken when a mobile computing device is in proximity to an ATM.

FIG. 6 depicts a flowchart 600 of illustrative steps that may be performed in establishing an initial connection between a mobile computing device and an ATM. The process starts with a wireless protocol exchange, such as an NFC protocol exchange, being initiated (602). With an NFC protocol, the process may be initiated by the mobile device with NFC capabilities being in proximity with the ATM. In response to the communication session being initiated, the display of the mobile computing device is updated to provide a visual cue that the communications have begun (604). An example of this is the graphic 506 of FIG. 5A. The mobile computing device and the ATM then exchange messages until a connection is established (606). When the connection is established, the display of the mobile computing device and the display of the ATM may be updated to provide a visual cue of the connection (608), such as 508, 512 and 514 shown in FIG. 5A and 521 shown in FIG. 5B.

Figure 7:
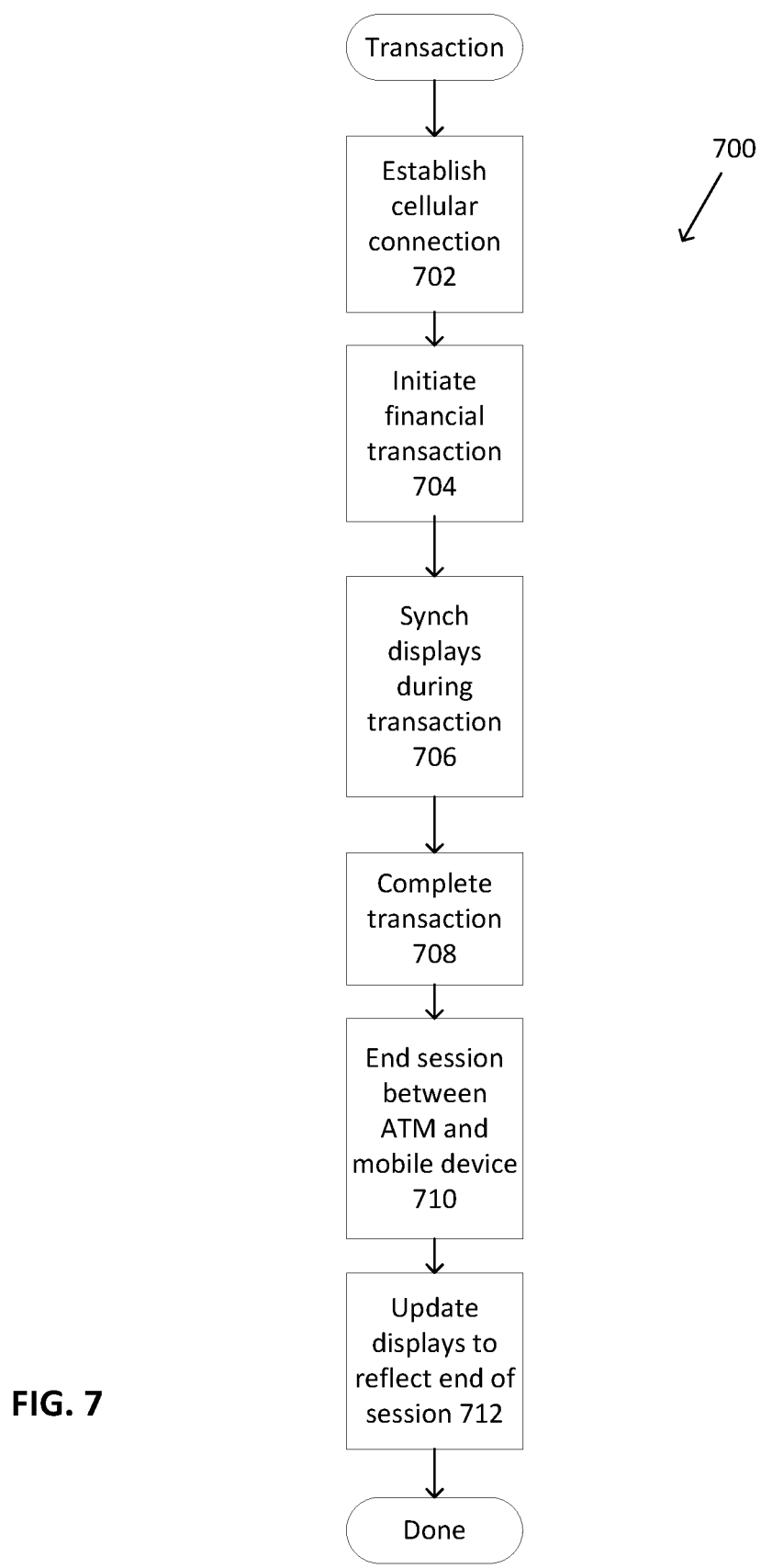
FIG. 7 depicts a flowchart of steps that may be taken to synch a display of a mobile computing device with a display of an ATM.

Once the cellular connection has been established, the mobile computing device and the ATM may establish and communicate via a cellular telephone connection (702 in flowchart 700 of FIG. 7). This may be initiated by the mobile computing device, such as by activating an application program that initiates a cellular connection with a server for the financial institution that operates the ATM. Other alternatives are possible. For instance, a user of the mobile computing device may be prompted to initiate the cellular connection, or a financial institution server may initiate the cellular connection. Once the cellular connection is established, a financial transaction with the ATM may be initiated by the user of the mobile computing device (704). In one example case, the application 206 (FIG. 2) on the mobile computing device provides a user interface for a user to initiate any of a number of different types of financial transactions. The user interface may provide menu options, user interface elements like selectable button, dropdown lists, a prompt, or other mechanisms for selecting a transaction.

Figure 8:
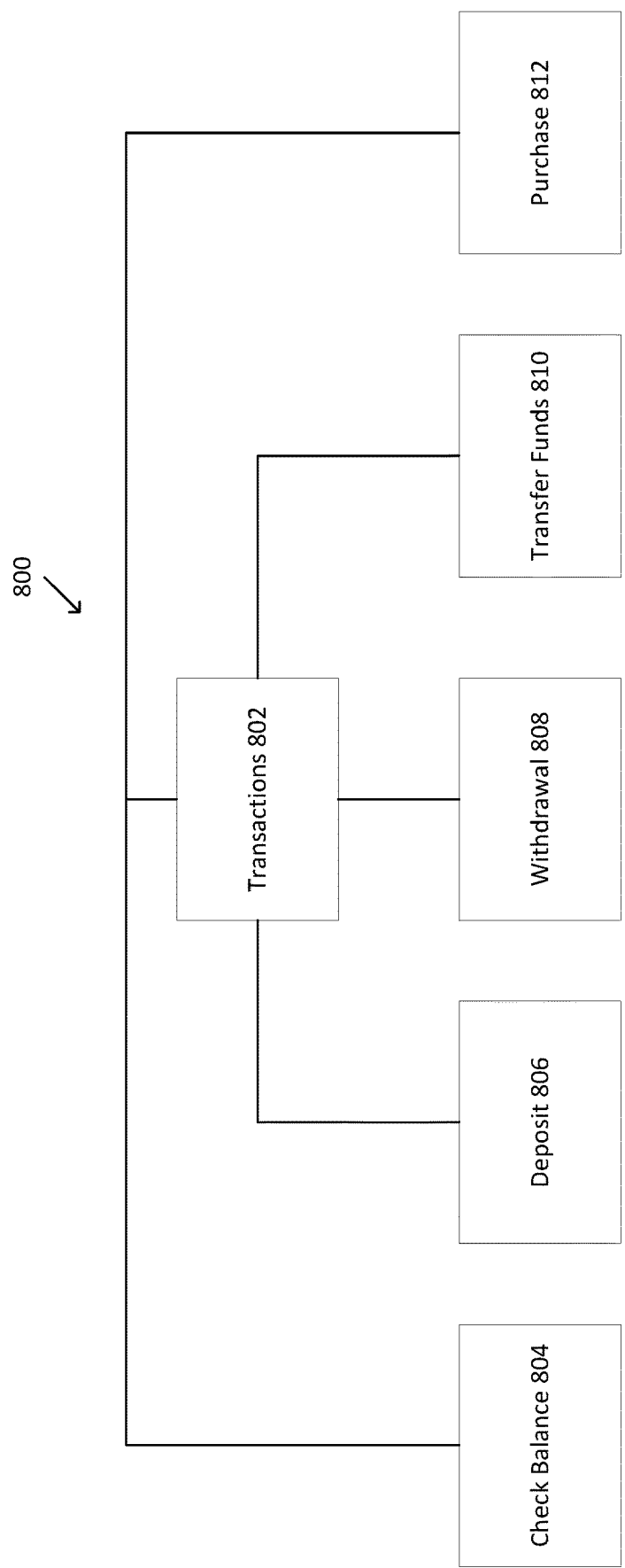
FIG. 8 depicts a flowchart of steps that may be taken to perform a financial transaction with the mobile computing device and the ATM.

FIG. 8 shows a diagram 800 depicting some of the types of transactions 802 that may be available to the user of the mobile computing device. A user may be able to check the current balance of one or more accounts with the financial institution (804). This may entail displaying the balance on a display or printing a receipt containing the balance. The user may be able to make a deposit (806). The ATM may include one or more receptacles for receiving cash and/or checks for a deposit (such as found in the deposit hardware 318 in FIG. 3). The user may request to make a withdrawal of cash from an account (808). The cash will be dispensed via a cash dispenser (such as 314 in FIG. 3) of the ATM. A user may transfer funds from one account to another (810). The account may be owned by the user or may be external. Examples of such fund transfers include a transfer between a checking account and a savings account, an electronic funds transfer, such as a wire transfer, an electronic bill payment or the like, and an automated clearing house (ACH) transaction. A user may also make purchases (812) in some embodiments. The purchases may buy goods, like stamps or tickets, or services using funds from an account or using credit for an associated credit card account.

It should be appreciated that that the list of transactions is intended to be illustrative and not limiting. Other types of transactions may be realized via the approach disclosed herein.

Figure 9:
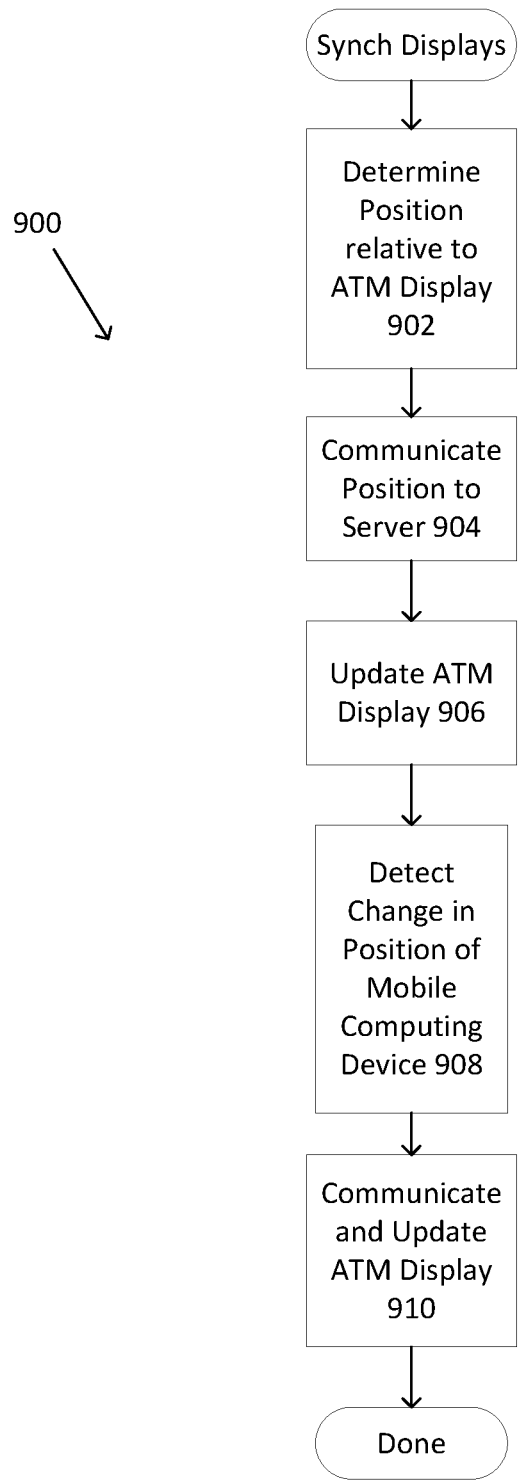
FIG. 9 depicts examples of types of financial transactions.

Once the transaction is initiated the display of the mobile computing device may be synched with the display of the ATM (706 in FIG. 7). FIG. 9 depicts a flowchart 900 of steps that may be performed to synch the displays. Initially, the position of the mobile computing device (and hence the associated display) relative to the display of the ATM is determined (902). This position determination may be based on the NFC interaction, GPS information and/or gyroscopic information from a gyroscope in the mobile computing device. In some instances, a camera (such as camera 216 in FIG. 2) on the mobile computing device may be used to determine the relative location. The camera may capture image of the ATM and know the proximity based on those images using conventional techniques for image processing. The location is communicated from the mobile computing device to the server (such as server 110 in FIG. 1) (904). Based on the communicated position information, the server or the ATM update the ATM display (906) so that the displays display content in the appropriate portions on the respective displays to appear to be in synch spatially as will be described below. Subsequently, based on the position information transmitted from the mobile computing device, the position of the display of the mobile computing device may be detected as changing (908) and the display of the ATM is updated accordingly (910). Since the display of the ATM is fixed, there is no need to be concerned with the position of the display of the ATM.

Figure 10A:
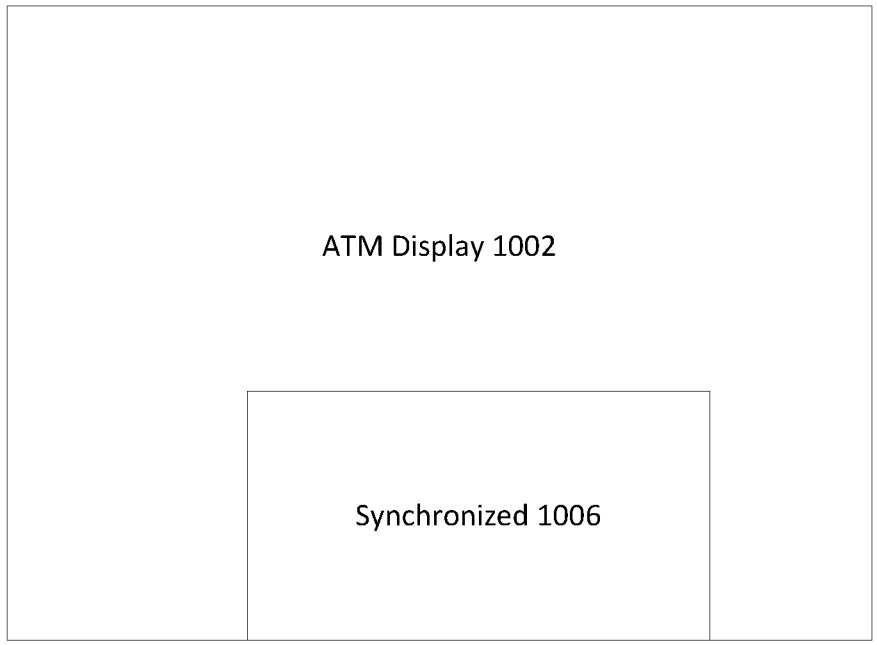
FIG. 10A depicts an illustration where the display of the mobile computing device and ATM display are synched.
Figure 10A:
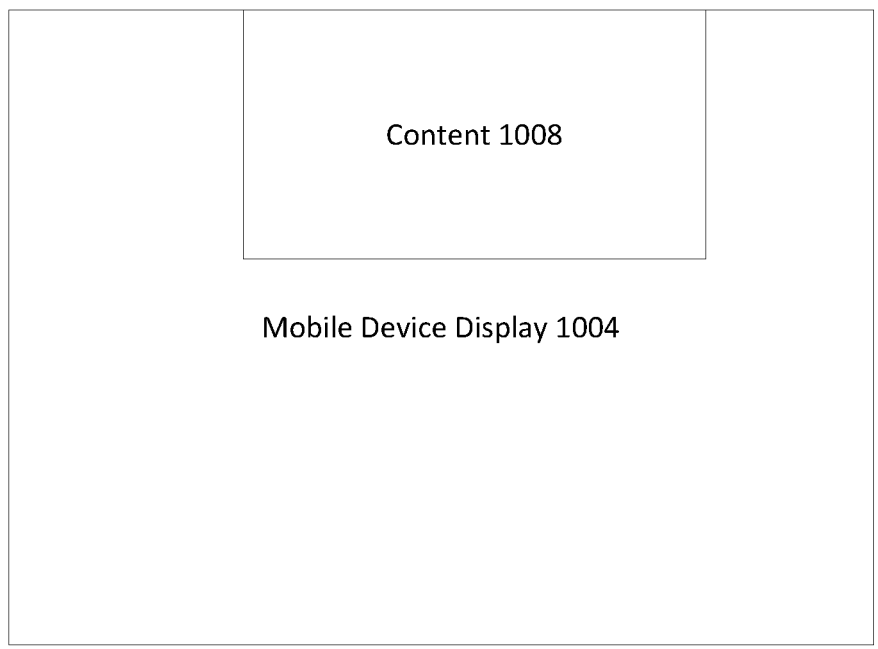

FIG. 10A illustrates an example of synchronized content 1006 and 1008 being shown on both a display of a mobile computing device 1004 and on an ATM display 1002. The synchronized content 1006 and 1008 are displayed in a manner that is synchronized both temporally and spatially. For example, if the synchronized content is graphic content where a portion is shown on both displays 1002 and 1004, the mobile computing device and the ATM must communicate to synch the timing of when the graphic content is displayed and where on the screen the respective portions of the content 1006 and 1008 are displayed. Moreover, the timing of removal of the content must be synched and communicated between the mobile computing device and ATM. When the content is dynamic, such as an animation or video, timing and positioning of the display of the respective portions is critical.

Figure 10B:
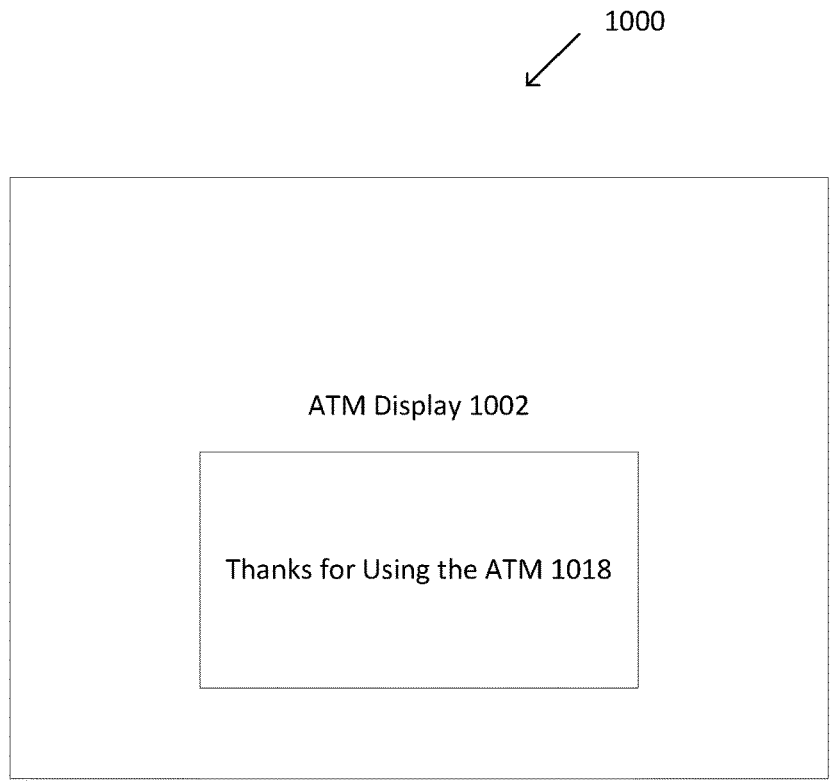
FIG. 10B depicts an example of the display of the mobile computing device and the display of the ATM when a financial transaction is complete.
Figure 10B:
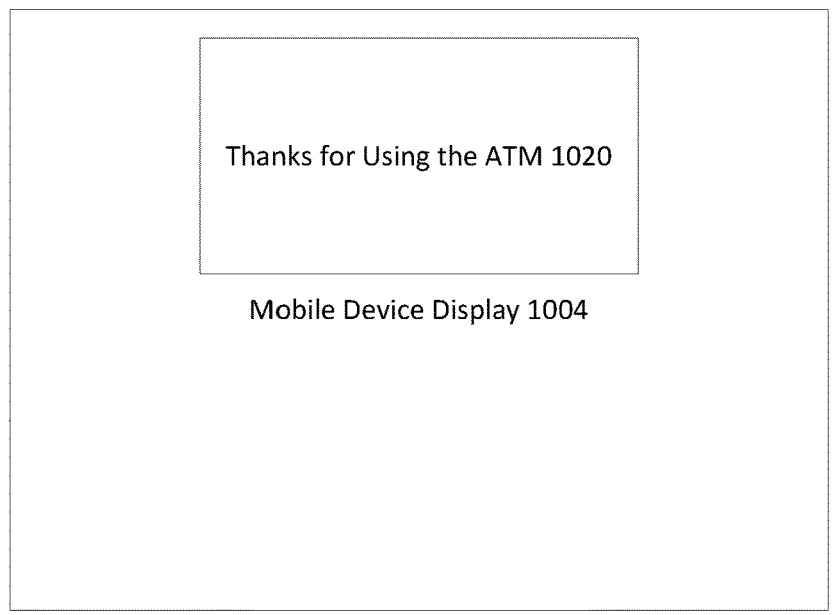

When the transaction is complete (708 in FIG. 7), the transaction session between the mobile computing and the ATM may be completed (710). This is akin to the ending of a traditional ATM transaction. The cellular connection between the mobile computing device is terminated at the end of the session. The displays 1002 and 1004 are updated to provide a visual cue that the transaction is complete (712). FIG. 10B shows a diagram 1000 depicting an example of the synched display of an end of transaction message 1018 and 1020 on the respective displays 1002 and 1004.

Figure 11:
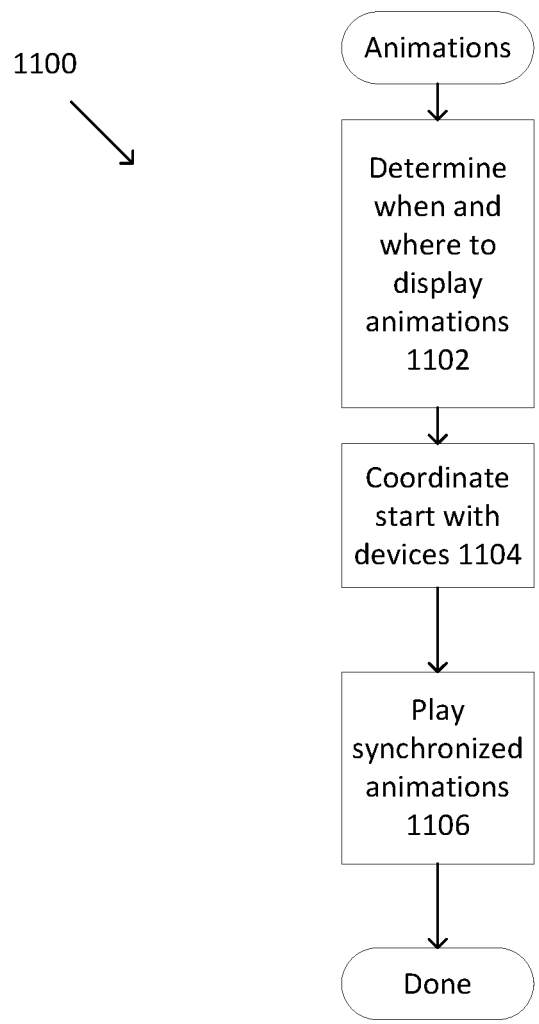
FIG. 11 depicts a flowchart of steps that may be performed to provide animations that are synched on the display of the mobile computing device and the display of the ATM.

The positioning and the timing of synchronized timing can be especially acute when the content is a shared animation. FIG. 11 depicts a flowchart 1100 of steps that may be taken with respect to showing an animation across synchronized displays on a mobile computing device and an ATM. The first step is to determine where and when to display the animation across the displays (1102). This step will be described below in more detail with reference to FIG. 12. The starting of the separate displays of the animation between the mobile computing device and the ATM are coordinated (1104). For instance, the mobile computing device and the ATM may synch their clocks and agree to start the animations at a specific clock time. Alternatively, the camera of the mobile computing device may be used to capture the animation on the ATM display and the captured images may be used to synch accordingly. In some instance a portion of a common animation may be displayed on both displays. In other instances, separate but related animations may be displayed on both displays. The synchronized animations are then displayed on the displays of the mobile computing device and the ATM (1106). Communications may be exchanged during the playing to ensure the animations remain temporally and spatially synched. In some embodiments, frames may be added or removed to slow down or speed up an animation.

Figure 12:
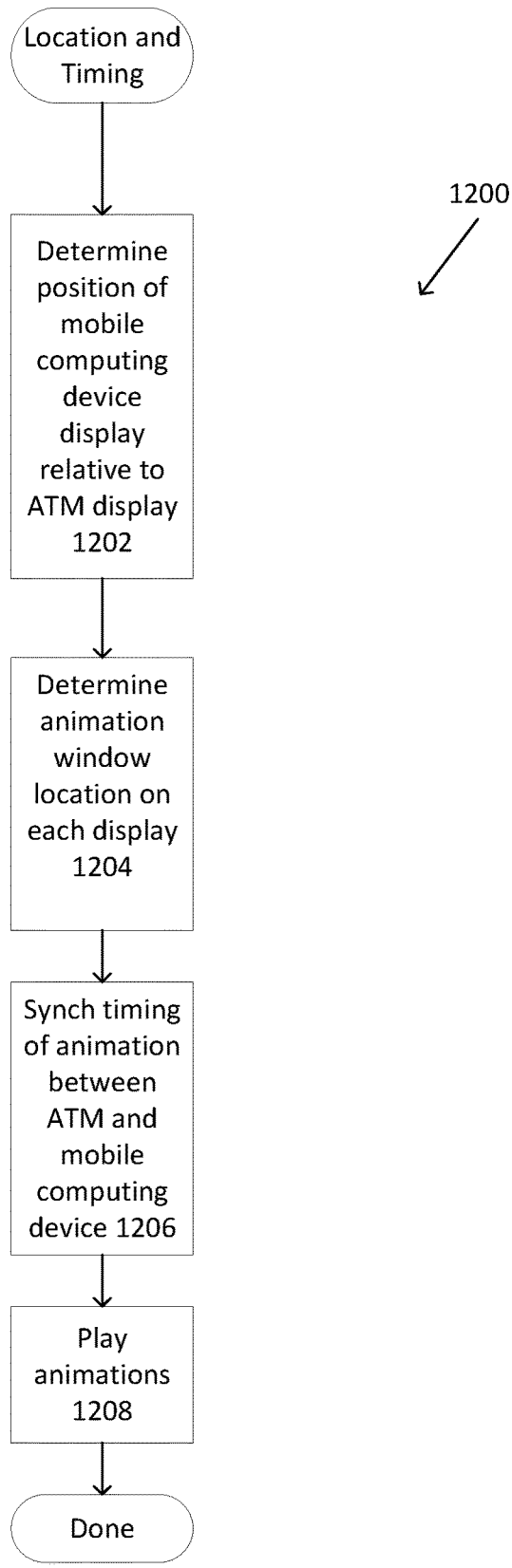
FIG. 12 depicts a flowchart of steps that may be performed to determine the location and timing for showing synched animations on the display of the mobile computing device and the display of the ATM.

FIG. 12 depicts a flowchart 1200 of steps that may be performed in resolving the location and timing of the display of animations on the mobile computing device and the ATM. First, the relative position of the display of the mobile computing device relative to the display of the ATM is determined (1202), such as has been described above. Next, a determination is made regarding where to position an animation window is on each display (1204). This may depend what effect is sought. If the desired effect is to have the animations appear as a single animation, the windows may be positioned on a display edge so that content appears to rollover from one display to another. In other cases, the animations may be distinct and therefore the positioning of the animation window may be independent of the positioning in the other display. The timing of the start of the animations is then synched such as described above (1206). The animations are then displayed in the respective animation windows (1208). The animations may take the form of video or dynamic graphic content.

While the present invention has been described with reference to exemplary embodiments, those skilled in the art will appreciate that various changes in form and detail may be made without departing from the intended scope of the present invention as defined in the appended claims.

What is claimed is:

1. An automated teller machine (ATM), comprising:
an ATM display;
a wireless communications interface for enabling wireless communication with a mobile computing device via a wireless protocol;
a non-transitory storage medium for storing computer programming instructions; and
a processor configured to execute the computer programming instructions to:
engage in a wireless communication with the mobile computing device via the wireless protocol, wherein the wireless protocol requires proximity between the mobile computing device and the ATM;
determine a position of the mobile computing device via at least one of a near field communication (NFC) transceiver located on the ATM and in communication with the mobile computing device, a camera device located on the ATM, global positioning system (GPS) information received from the mobile computing device, or gyroscopic information received from the mobile computing device;
display, based on the position of the mobile computing device, a proximity indication on the display of the ATM that the mobile computing device is within a predetermined proximity of the ATM;
receive content display messages from a server communicatively coupled to the ATM and the mobile computing device, the content display messages to instruct the processor to display content on the ATM display synchronized with a presentation of content on a display of the mobile computing device so that content on the ATM display is related to content that is simultaneously displayed on the display of the mobile computing device, wherein being synchronized results in the ATM display displaying an image or a first portion of the image and the display of the mobile computing device displaying the image or a second portion of the image simultaneously;
display the content on the ATM display while the wireless communication between the ATM and the mobile computing device remains active; and
update the content to indicate that the wireless communication is complete.

2. The ATM of claim 1, wherein being synchronized results in the display of the ATM and the display of mobile computing device displaying a same content simultaneously.

3. The ATM of claim 1, wherein the wireless protocol is a near field communication (NFC) protocol.

4. The ATM of claim 1, wherein the mobile computing device is one of a smartphone, a tablet computer, a smartwatch or a wearable computing device.

5. The ATM of claim 1, wherein the proximity of the mobile computing device is determined based on GPS information from the mobile computing device.

6. The ATM of claim 1, the processor configured to execute the computer programming instructions to communicate with the mobile computing device via a server communicatively coupled to the ATM via a private network, the mobile computing device communicatively coupled to the server over a cellular phone network responsive to initiation of the wireless communication between the mobile computing device and the ATM.

7. The ATM of claim 1, wherein the content comprises an animation.

8. The ATM of claim 7, wherein the computer programming instructions include instructions for presenting the animation on the ATM to appear as a single animation in combination with the presentation of the animation on the display of the mobile computing device, the single animation appearing to roll over from the ATM display to the display of the mobile computing device.

9. The ATM of claim 1, wherein, the processor is configured to initially display nothing on the ATM display, and then display the proximity indication by pulsing the proximity indication on the ATM display as the mobile computing device gets closer to the ATM display.

10. The ATM of claim 9, wherein, the processor is configured to pulse the proximity indication on the ATM display until the wireless communication between the ATM and the mobile computing device is established.

11. The ATM of claim 1, wherein the processor being configured to display the proximity indication based on the position of the mobile computing device includes the processor being configured to display the proximity indication based a position of the ATM display relative to a position of the display of the mobile computing device.

12. A mobile computing device, comprising:
a display;
a clock that keeps time;
a non-transitory storage medium storing computer programming instructions;
a wireless interface for facilitating wireless communications with an automated teller machine (ATM) using a wireless protocol; and
a processor configured for executing the computer programming instructions, causing the processor to:
engage in a wireless communication with the ATM via the wireless protocol, wherein the wireless protocol requires proximity between the mobile computing device and the ATM;

exchange at least one first message with the ATM to synchronize the clock of the mobile computing device with a clock of the ATM;

exchange at least one second message with the ATM via the wireless interface to agree to start display of an animation at a specific clock time and during the wireless communication with the ATM;

communicate instructions to the display to present the animation on the display of the mobile computing device synched with a corresponding animation on an ATM display of the ATM; and communicate instructions to the display to end display of the animation on the display of the mobile computing device in response to the wireless communication with the ATM terminating.

13. The mobile computing device of claim 12, wherein the animation that is displayed on the display of the mobile computing device and the corresponding animation displayed on the ATM display of the ATM are parts of a shared animation.

14. The mobile computing device of claim 13, wherein the animation is positioned on the display of the mobile computing device to appear as a portion of the shared animation when viewed in conjunction with the corresponding animation.

15. The mobile computing device of claim 12, wherein the computer programming instructions include instructions for establishing a cellular connection with a financial institution associated with the ATM.

16. The mobile computing device of claim 15, wherein the computer programming instructions include instructions for conducting a financial transaction with the ATM via the cellular connection.

17. The mobile computing device of claim 12, wherein the processor being caused to communicate instructions to the display to present the animation on the display of the mobile computing device includes being caused to display the animation based a position of the ATM display relative to a position of the display of the mobile computing device.

18. The mobile computing device of claim 12, wherein the processor is configured to capture images of the ATM display, using an image capturing device of the mobile computing device, to ensure the display of the animation on the ATM display and the mobile computing device both start at the specific clock time.

19. The mobile device of claim 12, wherein the animation displayed on the ATM display is a first portion of a larger animation and the animation displayed on the mobile computing device is a second portion of the larger animation.

20. The mobile device of claim 12, wherein the processor is configured to add or remove frames from the animation to speed up or to slow down the animation to ensure that animation displayed on the display of the mobile computing device is synchronized with the animation displayed on the ATM display.

* * * * *